United States Patent [19]

Maringer et al.

[11] 4,299,713

[45] Nov. 10, 1981

[54] ELECTRICAL TREE AND WATER TREE RESISTANT POLYMER COMPOSITIONS

[75] Inventors: Melvin F. Maringer; Anthony Barlow, both of Cincinnati, Ohio

[73] Assignee: National Distillers and Chemical Corp., New York, N.Y.

[21] Appl. No.: 161,932

[22] Filed: Jun. 23, 1980

Related U.S. Application Data

[63] Continuation-in-part of Ser. No. 58,878, Jul. 19, 1979.

[51] Int. Cl.$^3$ .............................................. H01B 3/18
[52] U.S. Cl. ......................... 174/110 SR; 174/110 R; 174/110 PM; 427/117; 260/45.7 SF; 260/45.7 PH
[58] Field of Search ................... 252/63.2, 63.7; 174/110 SR, 110 R, 110 PM; 427/117; 260/45.7 SF, 45.7 PH

[56] References Cited

U.S. PATENT DOCUMENTS 3,322,718  5/1967  Jacob ..................... 260/45.7 PH X
3,553,348  1/1971  Betts .......................... 174/110 SR
3,933,733  1/1976  Kimura et al. ............. 260/45.7 PH
4,144,202  3/1979  Ashcraft et al. ................. 252/63.2
4,156,677  5/1979  Williams .......................... 260/42.15

FOREIGN PATENT DOCUMENTS 2737430  2/1979  Fed. Rep. of Germany ..... 252/63.2
2805875  8/1979  Fed. Rep. of Germany ..... 252/63.2
1248256  9/1971  United Kingdom ............... 252/63.2
1414513  11/1971  United Kingdom .
1277378  6/1972  United Kingdom ............... 252/63.2
1478484  6/1977  United Kingdom .
1511308  5/1978  United Kingdom .
1532709  11/1978  United Kingdom .

Primary Examiner—Mayer Weinblatt
Attorney, Agent, or Firm—Kenneth D. Tremain

[57] ABSTRACT

A unfilled polymeric composition having improved electrical treeing and water treeing properties comprising a polymeric component and effective amounts of an organic compound, such as, a specially defined silane. These compositions are particularly useful as insulation for high voltage transmission and distribution cables.

42 Claims, No Drawings

ELECTRICAL TREE AND WATER TREE RESISTANT POLYMER COMPOSITIONS

CROSS REFERENCE TO RELATED APPLICATION

This is a continuation-in-part of application Ser. No. 58,878, filed July 19, 1979.

BACKGROUND OF THE INVENTION

This invention relates to polymeric compositions having increased resistance to electrical treeing and water treeing properties, said compositions being useful as insulation for electrical cables.

Polymeric compositions are well-known and are used extensively as insulation materials for wire and cable. As an insulator, it is important that the composition have various physical and electrical properties, such as resistance to mechanical cut through, stress crack resistance and dielectric failure. Recent publications have indicated that water tree growth and electrical tree growth in the insulation are particularly important problems since they are associated with, though not necessarily totally responsible for, dielectric failure.

An important application for an insulation material is in high voltage transmission and distribution cable, especially in direct buried underground service and three types of trees have been observed in power cables, to wit, electrical trees, water trees and electrochemical trees. It is generally believed that electrical trees are generated by corona discharges causing fusion and breakdown of the polymer, whereas water trees are usually observed in cables buried in wet locations and have a different appearance compared to the electrical trees. The eletrochemical trees are similar to the water trees but are characterized by the presence of metal ions in the trees.

U.S. Pat. No. 4,144,202 granted to Ashcraft et al. relates to inhibiting the electrical breakdown of insulation by water treeing in dielectric materials based on ethylene polymers. This patent discusses electrical failures which are due to treeing and explains the concept of treeing and some of the causes for treeing. In general, as the polymeric composition breaks down the damage progresses through the insulator, or dielectric, in a path that looks something like a tree. Treeing usually is a slow type failure and may take years to cause a failure in the insulation. As disclosed in the patent, water treeing is inhibited in the ethylene polymer compositions by employing therein certain organo silane compounds. In particular, the organo silane is a silane containing an epoxy containing radical. Suitable polymers, adjuvants and processing procedures for preparing the composition are described in the patent, which patent is hereby incorporated by reference.

U.S. Pat. No. 4,206,260 granted to McMahon relates to insulation particularly suitable for high voltage power cable containing an effective amount of an alcohol of 6 to 24 carbon atoms which imparts electrical tree growth resistance to the composition. This patent, as in U.S. Pat. No. 4,144,202, supra, contains a discussion of the electrical treeing problem in polymer compositions and cites numerous patents attempting to overcome this problem. Suitable polymers, adjuvants and preparation procedures are noted therein and this patent is hereby incorporated by reference.

German Offenlegungsschrift No. 2,737,430 discloses that certain alkoxysilanes added to polyolefin insulation prevent water-tree formation. Several trimethoxy and triethoxy silanes are said to be useful. No alkoxyalkoxy silanes are taught or suggested as having both water treeing and electrical treeing inhibiting properties.

U.S. Pat. No. 3,553,348 granted to Betts, British Pat. No. 1,248,256 granted to General Electric Company and British Pat. No. 1,277,378 granted to General Electric Company relate to mineral filled polymer compositions useful as electrical wire and cable insulation. The mineral filler is treated with an organosilane such as an alkyl alkoxysilane or a vinyl alkoxysilane to decrease the porosity of the composition. None of these patents teach or suggest that addition of an organosilane to an unfilled polymer composition will beneficially enhance the water treeing and electrical treeing resistance of the polymer composition.

Unfortunately, however, the prior art has not provided an insulation composition having both increased resistance to water treeing and electrical treeing. As noted in U.S. Pat. No. 4,144,202, supra, intrinsic electric breakdown, failure by corona, electrical treeing and water treeing are different and the mechanisms for each are different and a different solution is required to effect an improvement in a dielectric material for each mode of failure involved. Thus, the problem of providing a single composition capable of resisting both electrical treeing and water treeing is a formidable one confronting the art.

SUMMARY OF THE INVENTION

It has now been unexpectedly discovered that polymeric compositions comprising an effective amount of a certain organic compound, such as a specially defined silane component, exhibit both enhanced resistance to water treeing and electrical treeing properties. The composition may also be cured using known techniques to provide a crosslinked composition having further improved properties for certain applications.

In general, the polymeric composition comprises per hundred parts by weight polymer (phr) about 0.1 to 10 phr of a silane having the following formula A:

wherein R, $R_1$, $R_2$ and $R_3$ are each independently selected from $C_1$ to $C_8$ alkyl, $C_1$ to $C_8$ alkoxy, $C_1$ to $C_8$ acyloxy, $C_6$ to $C_{18}$ aryloxy or substituted aryloxy, $C_6$ to $C_{18}$ aryl or substituted aryl, hydrogen, halogen, an epoxy containing radical, $C_2$ to $C_8$ alkenyl, a nitrogen containing radical, a carboxy containing radical, a mercapto containing radical and an ether containing radical, with the proviso that at least one, and preferably at least three, e.g., all of R, $R_1$, $R_2$ and $R_3$ be a group wherein the group contains at least one electron donating atom in the chain of the group and which is at a position other than the position adjacent to the silicon atom. The electron donating group may be, for example, oxygen, nitrogen, sulphur and the like. Oxygen is preferred because of its demonstrated effectiveness. A highly preferred group has the electron donating atom separated from the silicon atom by three atoms.

A preferred composition comprises about 0.5 to 5 phr silane component, most preferably about 1 to 3 phr.

A particularly preferred unfilled polymeric composition comprises a homogeneous mixture of a polymeric component and an effective amount, as a water treeing and electrical treeing inhibitor, of an organic compound having the following formula B:

$$R_2-\underset{(R_3)_a}{\overset{R_1}{Z}}-Y_1(C_nH_{2n})Y_2R_6$$

wherein $R_1$, $R_2$ and $R_3$ are the same or different and are $Y_1(C_nH_{2n})$ $Y_2R_6$, $C_1$ to $C_8$ alkyl, $C_1$ to $C_8$ alkoxy, $C_1$ to $C_8$ acyloxy, $C_6$ to $C_{18}$ aryloxy or substituted aryloxy, $C_6$ to $C_{18}$ aryl or substituted aryl, hydrogen, halogen an epoxy containing radical, $C_2$ to $C_8$ alkenyl, a nitrogen containing radical, a carboxy containing radical, a mercapto containing radical or an ether containing radical; $R_6$ is $C_1$ to $C_8$ alkyl, $C_1$ to $C_8$ alkoxy, $C_1$ to $C_8$ acyloxy, $C_6$ to $C_{18}$ aryloxy or substituted aryloxy, $C_6$ to $C_{18}$ aryl or substituted aryl, hydrogen, halogen, an epoxy containing radical, $C_2$ to $C_8$ alkenyl, a nitrogen containing radical, a carboxy containing radical, a mercapto containing radical or an ether containing radical;

$Y_1$ and $Y_2$ are the same or different and are O, S or NH;

Z is Si, Sn, Ti, P or B;

a is 0 or 1; and n is 1 to 8.

This particularly preferred composition comprises about 0.1 to 10 parts (by weight) per hundred parts (phr) of polymer of the organic compound of formula B. An especially preferred composition comprises about 0.5 to 5 phr of organic compound component, preferably about 1 to 3 phr.

The composition of this invention may also be described as a polymeric composition, having enhanced resistance to water treeing and electrical treeing, consisting essentially of (1) a polymeric component, (2) an effective amount, as a water treeing and an electrical treeing inhibitor, of an organic compound having the formula:

$$R_2-\underset{(R_3)_a}{\overset{R_1}{Z}}-Y_1(C_nH_{2n})Y_2R_6$$

wherein $R_1$, $R_2$ and $R_3$ are the same or different and are $Y_1(C_nH_{2n})$ $Y_2R_6$, $C_1$ to $C_8$ alkyl, $C_1$ to $C_8$ alkoxy, $C_1$ to $C_8$ acyloxy, $C_6$ to $C_{18}$ aryloxy or substituted aryloxy, $C_6$ to $C_{18}$ aryl or substituted aryl, hydrogen, halogen, an epoxy containing radical, $C_2$ to $C_8$ alkenyl, a nitrogen containing radical, a carboxy containing radical, a mercapto containing radical or an ether containing radical; $R_6$ is $C_1$ to $C_8$ alkyl, $C_1$ to $C_8$ alkoxy, $C_1$ to $C_8$ acyloxy, $C_6$ to $C_{18}$ aryloxy or substituted aryloxy, $C_6$ to $C_{18}$ aryl or substituted aryl, hydrogen, halogen, an epoxy containing radical, $C_2$ to $C_8$ alkenyl, a nitrogen containing radical, a carboxy containing radical, a mercapto containing radical or an ether containing radical;

$Y_1$ and $Y_2$ are the same or different and are O, S or NH;

Z is Si, Sn, Ti, P or B;

a is 0 or 1; and n is 1 to 8, (3) 0 to less than 10% filler, and (4) effective amounts of cross-linking agent, antioxidant, plasticizer, dye, pigment, heat stabilizer, light stabilizer or antistatic agent.

This invention is also directed to a method of stabilizing an unfilled polymeric insulated electrical conductor against water treeing and electrical treeing which comprises coating an electrical conductor with an insulating effective amount of an unfilled polymeric insulating composition, said composition comprising a homogeneous mixture of a polymeric component and an effective amount, as a water treeing and electrical treeing inhibitor, of an organic compound having the following formula B:

$$R_2-\underset{(R_3)_a}{\overset{R_1}{Z}}-Y_1(C_nH_{2n})Y_2R_6$$

wherein $R_1$, $R_2$ and $R_3$ are the same or different and are $Y_1(C_nH_{2n})$ $Y_2R_6$, $C_1$ to $C_8$ alkyl, $C_1$ to $C_8$ acyloxy, $C_6$ to $C_{18}$ aryloxy or substituted aryloxy, $C_6$ to $C_{18}$ aryl or substituted aryl, hydrogen, halogen, an epoxy containing radical, $C_2$ to $C_8$ alkenyl, a nitrogen containing radical, a carboxy containing radical, a mercapto containing radical or an ether containing radical, $R_6$ is $C_1$ to $C_8$ alkyl, $C_1$ to $C_8$ alkoxy, $C_1$ to $C_8$ acyloxy, $C_6$ to $C_{18}$ aryloxy or substituted aryloxy, $C_6$ to $C_{18}$ aryl or substituted aryl, hydrogen, halogen, an epoxy containing radical, $C_2$ to $C_8$ alkenyl, a nitrogen containing radical, a carboxy containing radical, a mercapto containing radical or an ether containing radical;

$Y_1$ and $Y_2$ are the same or different and are O, S or NH;

a is 0 or 1; and n is 1 to 8, whereby said insulated electrical conductor exhibits water treeing and electrical treeing inhibition when exposed to an environment subject to water treeing and electrical treeing conditions.

The compositions of the invention find particular utility in high voltage transmission and distribution cables but are useful in other electrical applications where a unique combination of enhanced water treeing and electrical treeing properties are needed.

DESCRIPTION OF THE PREFERRED EMBODIMENTS

In general, the polymers suitble for the practice of this invention include any normally solid synthetic organic polymeric thermoplastic resin. Included are polyolefins and copolymers thereof, vinyls, olefin-vinyl copolymers, olefin-allyl copolymers, polyamides, acrylics, polystyrenes, cellulosics, polyesters and fluorocarbons.

The polyolefins include normally solid polymers of olefins, particularly mono-alpha-olefins, which comprise from about two to about six carbon atoms, e.g., polyethylene, polypropylene, polybutene, polyisobutylene, poly(4-methyl-pentane), and the like. Preferred polyolefins are polyethylene and polypropylene. Polyethylene is especially preferred. An especially preferred polyethylene because of is demonstrated effectiveness is termed NA 310 and is sold by National Distillers and Chemical Company.

Copolymers of ethylene, and other compounds interpolymerizable with ethylene such as butene-1, pentene-1, styrene and the like may be employed. In general the ethylene will comprise about 50 to <100 weight % ethylene.

Suitable vinyl polymers include polyvinyl chloride, polyvinyl acetate, vinyl chloride/vinyl acetate copolymers, polyvinyl alcohol and polyvinyl acetal.

Suitable olefin-vinyl copolymers include ethylene-vinyl acetate, ethylene-vinyl propionate, ethylene-vinyl isobutyrate, ethylene-vinyl alcohol, ethylene-methyl acrylate, ethylene-ethyl acrylate, ethylene-ethyl methacrylate, and the like. In general the ethylene constitutes at least about 25% of the copolymer by weight.

Olefin-allyl copolymers include ethylene-allyl benzene, ethylene-allyl ether, ethylene-acrolein, and the like.

The silane employed in the polymeric compositions of the invention may be selected from one or more compounds of the following formula A:

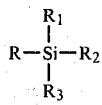

wherein R, $R_1$, $R_2$ and $R_3$ are defined as hereinabove in connection with formula A.

The organic compound employed in the particularly preferred unfilled polymeric compositions of the invention is selected from one or more compounds of the following formula B:

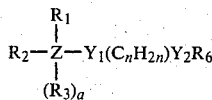

wherein $R_1$, $R_2$, $R_3$, $R_6$, $Y_1$, $Y_2$, Z, a and n are defined as hereinabove in connection with formula B.

A number of R, $R_1$, $R_2$ and $R_3$ groups useful in connection with the present invention is shown in "Chemicals and Plastics Physical Properties. 1978-80" published by Union Carbide Company on page 43 the disclosure of which is hereby incorporated by reference. Exemplary are chloro, methyl, ethyl, methoxy, ethoxy, phenyl, hydrogen, chloropropyl, vinyl 2-methoxyethoxy, gamma-methacryloxypropyl, beta-(3,4epoxycyclohexyl)-ethyl, gamma-glycidoxypropyl, acetoxy, gamma-mercaptopropyl, gamma-aminopropyl, bis-hydroxyethyl-gamma-amino-propyl, bis-acylic acid gamma-amino-propyl, N-beta(aminoethyl)-gamma-amino-propyl, and methyl [2(gamma-trimethoxysilylpropylamino)ethylamino]3 propionate.

As noted hereinabove, at least one of the R, $R_1$, $R_2$ and $R_3$ groups of formula A have an electron donating atom such as oxygen, nitrogen or sulphur atom in the chain of the groups. Preferably the electron donating atom is separated from the silicon atom by three atoms. A preferred group has the following formula, ($OR_4OR_5$)

wherein $R_4$ is $C_1$ to $C_6$ and $R_5$ is a $C_1$ to $C_8$ alkyl, hydrogen, $C_1$ to $C_8$ alkoxy or $C_2$ to $C_8$ alkenyl. A particularly preferred group is 2-methoxyethoxy which has the formula,

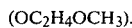

A preferred compound is sold under the name A-172 by Union Carbide Company and is chemically defined as vinyl-tris (2-methoxyethoxy) silane. Other R, $R_1$, $R_2$ and $R_3$ groups include gamma-methacryloxy-propyl, gamma-glycidoxypropyl, gamma-aminopropyl, bis-hydroxy-ethyl-gamma-aminopropyl and N-beta (aminoethyl)-gamma-aminopropyl.

The $R_1$, $R_2$ and $R_3$ groups of formula B useful in connection with the present invention when Z is silicon, include examples of the groups discussed above in connection with the Union Carbide Company publication, particularly when $Y_1(C_nH_{2n})Y_2R_6$ is an alkoxyalkoxy groups. Among the useful silanes of formula B are gamma-methacryloxypropyl-tris(2-methoxyethoxy) silane, tetrakis(2-methoxyethoxy) silane, methyl-tris (2-methoxyethoxy) silane, phenyl-tris(2methoxyethoxy) silane, vinyl-tris (2-phenoxyethoxy) silane, vinyl-tris (2-methylthioethoxy) silane and vinyl-tris (2-methoxyethoxy) silane with the latter being particularly preferred. Replacing the silicon with such atoms as tin, titanium, phosphorous or boron provides other useful compounds which find utility in the invention. Thus, such compound as tris (2-ethoxyethyl) phosphite, tris (2-n-butoxyethyl) phosphite, tetrakis (2-methoxyethoxy) titanium and the like may be employed and are included with the scope of this invention.

Therefore, in the preferred organic compounds of formula B, $R_1$, $R_2$, and $R_3$ are each selected from $Y_1(C_nH_{2n}) Y_2R_6$, alkyl, alkoxy, acyloxy, aryl or alkenyl, $R_6$ is alkyl or aryl, $Y_1$ and $Y_2$ are O and Z is Si or P. Of course, when Z is Si, a is 1 and when Z is P, a is 0.

When it is desired to use a polymeric composition which can be crosslinked, crosslinking can be accomplished by any of the known procedures such as chemical means including peroxide cross-linking; by radiation using electron accelerators, γ-rays, high energy radiation, such as X-rays, microwaves etc.; or by thermal crosslinking. The basic procedures for crosslinking polymers are extremely well known to the art and need not be described here in detail.

Conventional crosslinking agents such as organic peroxides may be suitably employed. Typical organic peroxide free radical generators inclupde dicumyl peroxide; 2,5-bis (tert.-butylperoxy)-2,5-dimethylhexane; di-t-butyl peroxide; benzoyl peroxide; α,α' bis (t-butyl peroxy) diisopropyl benzene and the like, as discussed in U.S. Pat. No 3,287,312. The amount of organic peroxide, when employed, will range from about 0.5 to 5.0% by weight based on the total weight of the composition, or about 0.5 to 10 phr, preferably 3 to 6 phr.

While the silanes and the organic compounds described hereinabove are useful for both thermoplastic and cured polymeric compositions, for compositions to be cured it is preferred that one of the groups, to wit, R, $R_1$, $R_2$, or $R_3$, be an organo functional group, e.g., a vinyl group, which group provides the composition with enhanced curing properties.

Minor amounts of other additives may also be employed in conventional amounts to obtain the desired results. Conventional antioxidants such as the hindered phenols, polyquinolines and the like may be employed. Other ingredients that may be included are plasticizers, dyes, pigments, heat and light stabilizers, antistatic agents and the like.

The compositions of this invention are unfilled polymer compositions. The term "unfllled" as applied to the instant composition shall mean a composition which contains less than 10% of a conventional polymer filler. For certain applications and to meet particular specifications the unfilled compositions herein may contain no filler. The compositiions of this invention may contain, therefore, 0 to less than 10% filler. Accordingly, fillers, such as mineral fillers, may be employed to this limited extent in preparing the compositions of the invention, but in the particularly preferred embodiment and for certain uses, these compositions contain no fillers.

The polymer compositions of this invention can be prepared by mixing the various ingredients. When the organic compound and the polymeric component are mixed together to form the instant compositions, the organic compound and polymeric component are homogeneously dispersed in each other. The order of mixing and specific procedure employed are not critical except to the extent that from the time the peroxide is added, if employoed, the temperature is less than about 130° C. in order to prevent premature curing of the composition. This precaution, however, is conventional in the art.

The components may be mixed on a variety of apparatus including multi-roll mills, screw mills, continuous mixers, compounding extruders and Banbury mixers.

After being extruded onto wire or cable, or other substrate, the crosslinkable compositions are vulcanizedat elevated tempertures, e.g., above about 180° C. using conventional vulcanizing procedures.

In order to determine the utility and effectiveness of the polymeric compositions of the present invention with regard to its inhibiting effect on the water treeing and the electrical treeing thereof, the compositions were evaluated by the use of accelerated tests.

Electrical tree tests were performed using the method similar to that in IEEE Conference Paper No. C73, 257-3 1973 by E. J. McMahon and J. R. Perkins. Strips of material approximately 1" wide were cut from a ¼- thick compression molded plaque. The block was machined to give a strip having parallel edges 1" apart. The strip was then cut into 1" square blocks. A blunt needle and a sharp needle were inserted into opposite parallel edges, at elevated temperatures, so that the points are ⅛" apart. Needle insertion and cooling of the sample was performed slowly to avoid inducing thermal or mechanical stresses in the specimen. The sharp needle has a tip diameter of about 0.0002" while the diameter of the blunt needle is 0.002". Eight specimens were prepared and tested simultaneously for each composition. The electrical tree test was performed by energizing the sharp needle at 15 KV using a frequency of 60 Hz; the blunt needle was connected to ground. The time required for each of the eight specimens to fail by tree growth and subsequent electrical short was recorded. The time required for 50% of the samples to fail was employed to characterize the effectiveness of the tree retardant being evaluated.

The water tree test is performed using a procedure similar to that described in U.S. Pat. No. 4,144,202. A compression molded disc about 150 millimeters (mm.) in diameter having 24 conical depressions was prepared for each composition. The geometry of the disc and dimensions of the depressions are substantially the same as shown in U.S. Pat. No. 4,144,202. The base of the disc is sprayed with silver paint which serves as the ground electrode. An acrylic tube 6" long is clamped to the upper face forming a test cell. About 150 ml. of 0.01 N sodium chloride solution was poured into the cell and the air bubbles trapped on the surface of the sample were removed. A platinum wire ring was then immersed in the electrolyte and connected to the electrical supply which provides 5 KV at a frequency of 3 KHz. Samples were energized for 22 hours after which time they were removed from the test cell and washed with distilled water. The ten central depressions were cut from the disc and stained to make the water trees more visible. Thin sections were obtained with a microtome, which were then examined microscopically (at 200X) and the tree size measured. Normally four discs were made for each sample so that the average tree size is calculated from forty individual measurements. In evaluating different tree retardants the relative tree size was determined by comparing the average tree size obtained on a standard thermoplastic high voltage insulation material containing no tree retardant additives.

Various embodiments of the present invention will now be illustrated by reference to the following specific examples. It is to be understood, however, that such examples are presented for purposes of illustration only, and the present invention is in no way to be deemed as limited thereby. All parts and percentages are by weight and temperatures in degrees Fahrenheit unless otherwise noted.

EXAMPLE I

The compositions were prepared by milling a commercial grade of polyethylene (NA 310) and the treeing additive (2% by weight) on a 2-roll mill at about 300° F. for about 10 minutes to obtain a homogeneous dispersion. The crepe obtained was then used to prepare the samples for electric tree and water tree testing using the procedures described hereinabove. The test results are shown in Table 1. All the compositions have the same formulation except for the "treeing" additive as noted in Table 1 and comprise a commercial grade of polyethylene having a Melt Index of about 0.20 to 0.35 g/10 min. and a density of about 0.917 grams/cubic centimeter (g/cc). The control sample does not contain a "treeing" additive.

TABLE I

| Sample No. | Treeing Additive | Double Needle Test Time to 50% Failure (minutes) | Water Tree (Relative Tree Size) |
|---|---|---|---|
| A | Vinyl-tris-(2-methoxy-ethoxy) silane | >12,700 (no failures) | 0.23 |
| B | Gamma-glycid-oxypropyl tri-methoxysilane | 2,800 | 0.34 |
| 1 | Control (No Additive) | 80 | 1 |
| 2 | Vinyl triethoxy silane | 30 | 0.29 |
| 3 | Beta-(3,4-epoxy-cyclohexyl)-ethyl-trimethoxysilane | 620 | 0.34 |
| 4 | Dodecanol | 127 | 0.34 |

The results clearly show the improvement in both water treeing and electrical treeing properties of formulations prepared in accordance with the present invention. Thus, comparing Samples A and B, of the invention, with Samples 1-4, which are outside the invention, the improvement is readily apparent. Comparing Sample A with the control, Sample 1, shows the vast improvement in properties when vinyl-tris (2-methoxyethoxy) silane is employed. Similarly, a comparison of Sample A with Sample 2 shows the importance for utilizing a silane having an electron donor atom in the chain of the groups attached to the silicon atom. A comparison of Sample A with Sample B shows the advantage of employing three electron donating group radicals attached ot the silicon atom.

EXAMPLE II

In the same fashion as in Example I, a number of organic compounds were evaluated as "treeing" additives. In all instances the additive was incorporated in the polyethylene at a concentration of 1.5%. The results of the electrical tree and water tree testing are shown in Table II.

The silanes evaluated demonstrated a superiority in both water tree and electrical tree resistance for those silanes having alkoxyalkoxy substituents. (Samples 6, 9, 10, 14, 22 and 23). This can be seen by comparing inter alia the silane pairs of samples 6 and 7, 9 and 11 and 13 and 14. It also appears that there is an optimum number of alkoxy alkoxy substituents—compare samples 6, 9 and 10. The effect of a vinyl substituent as compared to an alkyl or aryl substituent is evident from comparing samples 6, 9 and 22. The location of a particular substituent, viz, an aryl group, can influence the inhibition properties of the organic compound as seen from samples 22 and 23.

Samples 24 and 25 show that organic phosphites are effective in both water and electrical tree inhibition while sample 26 shows similar effectiveness for an organic titanium compound.

TABLE II

| Sample No. | Treeing Additive Structure | Name | Double Needle Test Time to 50% Failure (minutes) | Water Tree Test (Relative Tree Size) |
|---|---|---|---|---|
| 5 | — | Control | 75 | 1.00 |
| 6 | $(CH_3OCH_2CH_2O)_3SiCH=CH_2$ | Vinyl-tris(2-methoxy-ethoxy) silane | >6000 | 0.32 |
| 7 | $(C_2H_5O)_3SiCH=CH_2$ | Vinyltriethoxy-silane | 405 | 0.42 |
| 8 | $(CH_3\overset{O}{\overset{\|}{C}}O)_3SiCH=CH_2$ | Vinyltriacetoxysilane | 186 | 0.68 |
| 9 | $(CH_3OCH_2CH_2O)_3SiCH_3$ | Methyl-tris(2-methoxy-ethoxy) silane | >4800 | 0.37 |
| 10 | $(CH_3OCH_2CH_2O)_4Si$ | Tetrakis(2-methoxy-ethoxy) silane | 2820 | 0.33 |
| 11 | $(CH_3O)_3SiCH_3$ | Methyltrimethoxy silane | 92 | 0.75 |
| 12 | $(C_2H_5O)_3SiC_8H_{17}$ | n-Octyltriethoxysilane | 690 | 0.56 |
| 13 | $(CH_3O)_3SiCH_2CH_2CH_2O\overset{O}{\overset{\|}{C}}\overset{CH_3}{\overset{\|}{C}}=CH_2$ | gamma-Methacryloxypropyl-trimethoxysilane | 200 | 0.38 |
| 14 | $(CH_3OCH_2CH_2O)_3SiCH_2CH_2CH_2O\overset{O}{\overset{\|}{C}}\overset{CH_3}{\overset{\|}{C}}=CH_2$ | gamma-Methacryloxypropyl tris(2-methoxyethoxy) silane | 678 | 0.41 |
| 15 | $(CH_3O)_3SiCH_2CH_2CH_2OCH_2\overset{O}{\overset{/\backslash}{CH}CH_2}$ | gamma-Glycidoxypropyl-trimethoxysilane | 708 | 0.32 |
| 16 | $(CH_3O)_3SiCH_2CH_2CHCH_2\overset{O}{\overset{/\backslash}{CH}CH}\diagdown_{CH_2CH_2}\diagup$ | beta-(3,4-Epoxycyclohexyl) ethyltrimethoxysilane | 620 | 0.32 |
| 17 | $(CH_3\overset{CH_3}{\overset{\|}{C}}\underset{CH_3}{\underset{\|}{}}-O-O)_3SiCH=CH_2$ | Vinyl-tris(tert-butyl peroxy) silane | 180 | 0.85 |
| 18 | $(C_2H_5O)_3SiCH_2CH_2CH_2NH_2$ | gamma-Aminopropyl triethoxysilane | 80 | 0.24 |
| 19 | $(CH_3O)_3SiCH_2CH_2CH_2NHCH_2CH_2NH_2$ | N-beta(Aminoethyl)-gamma-amino-propyl-trimethoxy-silane | 152 | 0.31 |
| 20 | $(CH_3O)_3SiCH_2CH_2SH$ | Mercaptoethyltri-Methoxysilane | 125 | 0.53 |
| 21 | $(CH_3O)_3SiCH_2CH_2CH_2SH$ | Mercaptopropyl-trimethoxysilane | 265 | 0.60 |
| 22 | $(CH_3OC_2H_4O)_3Si\text{—}\hexagon$ | Phenyl-tris(2-methoxy-ethoxy)silane | 3600 | 0.35 |
| 23 | $(\hexagon\text{—}OCH_2CH_2O)_3SiCH=CH_2$ | Vinyl-tris(2-phenoxy ethoxy)silane | >6000 | 0.22 |
| 24 | $(C_2H_5OC_2H_4O)_3P$ | tris(2-Ethoxyethyl) phoshite | >20,000 | 0.09 |
| 25 | $(C_4H_9OC_2H_4O)_3P$ | tris(2-n-butoxyethyl) phosphite | 3000 | 0.30 |
| 26 | $(CH_3OC_2H_4O)_4Ti$ | tetrakis(2-Methoxy-ethoxy)titanium | 930 | 0.32 |

While the invention has been directed principally to the use of silanes, it will be understood by those skilled in the art that other compounds containing a multivalent atom such as titanium, tin, phosphorous, and the like may be employed.

What is claimed is:

1. An unfilled polymeric composition having enhanced resistance to water treeing and electrical treeing comprising a homogeneous mixture of a polymeric component and an effective amount, as a water treeing and an electrical treeing inhibitor, of an organic compound having the formula:

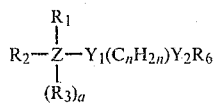

wherein $R_1$, $R_2$ and $R_3$ are the same or different and are $Y_1(C_nH_{2n})$ $Y_2R_6$, $C_1$ to $C_8$ alkyl, $C_1$ to $C_8$ alkoxy, $C_1$ to $C_8$ acyloxy, $C_6$ to $C_{18}$ aryloxy or substituted aryloxy, $C_6$ to $C_{18}$ aryl or substituted aryl, hydrogen, halogen, an epoxy containing radical, $C_2$ to $C_8$ alkenyl, a nitrogen containing radical, a carboxy containing radical, a mercapto containing radical or an ether containing radical; $R_6$ is $C_1$ to $C_8$ alkyl, $C_1$ to $C_8$ alkoxy, $C_1$ to $C_8$ acyloxy, $C_6$ to $C_{18}$ aryloxy or substituted aryloxy, $C_6$ to $C_{18}$ aryl or substituted aryl, hydrogen, halogen, an epoxy containing radical, $C_2$ to $C_8$ alkenyl, a nitrogen containing radical, a carboxy containing radical, a mercapto containing radical or an ether containing radical;

$Y_1$ and $Y_2$ are the same or different and are O, S or NH;

Z is Si, Sn, Ti, P or B;

a is 0 or 1; and n is 1 to 8 with the proviso that when Z is P, a is O, $Y_1$ and $Y_2$ are each O and $R_1$ and $R_2$ are the same and are $Y_1(C_nH_{2n})Y_2R_6$.

2. A composition as in claim 1 wherein the polymer is polyethylene.

3. A composition as in claim 1 wherein
$R_1$, $R_2$ and $R_3$ are each selected from $Y_1(C_nH_{2n})Y_2R_6$, alkyl, alkoxy, acyloxy, aryl or alkenyl,
$R_6$ is alkyl or aryl, and
$Y_1$ and $Y_2$ are each O.

4. A composition as in claim 3 wherein
Z is Si and
a is 1.

5. A composition as in claim 4 wherein
$R_1$ is vinyl,
$R_2$ and $R_3$ are each $Y_1(C_nH_{2n})$ $Y_2R_6$,
$R_6$ is methyl and
n is 2.

6. A composition as in claim 4 wherein
$R_1$ is methyl,
$R_2$ and $R_3$ are each $Y_1(C_nH_{2n})$ $Y_2R_6$,
$R_6$ is methyl and
n is 2.

7. A composition as in claim 4 wherein
$R_1$, $R_2$ and $R_3$ are each $Y_1(C_nH_{2n})$ $Y_2R_6$,
$R_6$ is methyl and
n is 2.

8. A composition as in claim 4 wherein
$R_1$ is gamma-methacryloxypropyl,
$R_2$ and $R_3$ are each $Y_1(C_nH_{2n})$ $Y_2R_6$,
$R_6$ is methyl and
n is 2.

9. A composition as in claim 4 wherein
$R_1$ is phenyl,
$R_2$ and $R_3$ are each $Y_1(C_nH_{2n})$ $Y_2R_6$,
$R_6$ is methyl and
n is 2.

10. A composition as in claim 4 wherein
$R_1$ is vinyl,
$R_2$ and $R_3$ are each $Y_1(C_nH_{2n})$ $Y_2R_6$,
$R_6$ is phenyl and
n is 2.

11. A composition in accordance with claims 4, 5, 6, 7, 8, 9 or 10 which is curable or cured.

12. An electrical conductor coated with the composition of claims 4, 5, 6, 7, 8, 9 or 10.

13. A composition as in claim 3 wherein
Z is Ti and
a is 1.

14. A composition as in claim 13 wherein
$R_1$, $R_2$ and $R_3$ are each $Y_1(C_nH_{2n})$ $Y_2R_6$,
$R_6$ is methyl and
n is 2.

15. A composition in accordance with claims 13 or 14 which is curable or cured.

16. An electrical conductor coated with the composition of claims 13 and 14.

17. A composition as in claim 1 wherein
Z is P,
$R_6$ is n-butyl and
n is 2.

18. A composition in accordance with claims 1, 2 or 3 which is curable or cured.

19. An electrical conductor coated with the composition of claims 1, 2 or 3.

20. A composition as in claim 1 wherein
Z is P,
$R_6$ is ethyl and
n is 2.

21. A composition in accordance with claims 20 or 17 which is curable or cured.

22. An electrical conductor coated with the composition of claims 20 or 17.

23. A method of stabilizing an unfilled polymeric insulated electrical conductor against water treeing and electrical treeing which comprises:
coating an electrical conductor with an insulating effective amount of an unfilled polymeric insulating composition, said composition comprising a homogeneous mixture of a polymeric component and an effective amount, as a water treeing and electrical treeing inhibitor, of an organic compound having the following formula

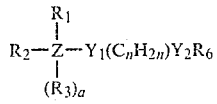

wherein $R_1$, $R_2$ and $R_3$ are the same or different and are $Y_1(C_nH_{2n})$ $Y_2R_6$, $C_1$ to $C_8$ alkyl, $C_1$ to $C_8$ alkoxy, $C_1$ to $C_8$ acyloxy, $C_6$ to $C_{18}$ aryloxy or substituted aryloxy, $C_6$ to $C_{18}$ aryl or substituted aryl, hydrogen, halogen, an epoxy containing radical, $C_2$ to $C_8$ alkenyl, a nitrogen containing radical, a carboxy containing radical, a mercapto containing radical or an ether containing radical; $R_6$ is $C_1$ to $C_8$ alkyl, $C_1$ to $C_8$ alkoxy, $C_1$ to $C_8$ acyloxy, $C_6$ to $C_{18}$ aryloxy or substituted aryloxy, $C_6$ to $C_{18}$ aryl or substituted aryl, hydrogen, halogen, an epoxy containing radical, $C_2$ to $C_8$ alkenyl, a nitrogen containing radical, a carboxy containing radical, a mercapto containing radical or an ether containing radical;

$Y_1$ and $Y_2$ are the same or different and are O, S or NH;

Z is Si, Sn, Ti, P or B;

a is 0 or 1; and n is 1 to 8 whereby said insulated electrical conductor exhibits water treeing and electrical treeing inhibition when exposed to an environment subject to water treeing and electrical treeing conditions.

24. A method as in claim 23 wherein the polymer is polyethylene.

25. A method in accordance with claims 23, 24 or 26 wherein the insulating composition is curable or cured.

26. A method as in claim 23 wherein
$R_1$, $R_2$ and $R_3$ are each selected from $Y_1(C_nH_{2n})Y_2R_6$, alkyl, alkoxy, acyloxy, and aryl or alkenyl,
$R_6$ is alkyl or aryl, and
$Y_1$ and $Y_2$ are each O.

27. A method as in claim 26 wherein
Z is Si and
a is 1.

28. A method as in claim 27 wherein
$R_1$ is vinyl
$R_2$ and $R_3$ are each $Y_1(C_nH_{2n})Y_2R_6$,
$R_6$ is methyl and
n is 2.

29. A method as in claim 27 wherein
$R_1$ is methyl
$R_2$ and $R_3$ are each $Y_1(C_nH_{2n})Y_2R_6$
$R_6$ is methyl and
n is 2.

30. A method as in claim 27 wherein
$R_1$, $R_2$ and $R_3$ are each $Y_1(C_nH_{2n})Y_2R_6$
$R_6$ is methyl and
n is 2.

31. A method as in claim 27 wherein
$R_1$ is gamma-methacryloxypropyl,
$R_2$ and $R_3$ are each $Y_1(C_nH_{2n})Y_2R_6$
$R_6$ is methyl and
n is 2.

32. A method as in claim 27 wherein
$R_1$ is phenyl,
$R_2$ and $R_3$ are each $Y_1(C_nH_{2n})Y_2R_6$,
$R_6$ is methyl and
n is 2.

33. A method as in claim 27 wherein
$R_1$ is vinyl,
$R_2$ and $R_3$ are each $Y_1(C_nH_{2n})Y_2R_6$,
$R_6$ is phenyl and
n is 2.

34. A method in accordance with claims 27, 28, 29, 30, 31, 32 or 33 wherein the insulating composition is curable or cured.

35. A method as in claim 26 wherein
Z is P and
a is 0.

36. A method as in claim 35 wherein
$R_1$ and $R_2$ are each $Y_1(C_nH_{2n})Y_2R_6$,
$R_6$ is ethyl and
n is 2.

37. A method as in claim 35 wherein
$R_1$ and $R_2$ are each $Y_1(C_nH_{2n})Y_2R_6$,
$R_6$ is n-butyl and
n is 2.

38. A method in accordance with claims 35, 36 or 37 wherein the insulating composition is curable or cured.

39. A method as in claim 26 wherein
Z is Ti and
a is 1.

40. A method as in claim 39 wherein
$R_1$, $R_2$ and $R_3$ are each $Y_1(C_nH_{2n})Y_2R_6$,
$R_6$ is methyl and
n is 2.

41. A method in accordance with claims 39 or 40 wherein the insulating composition is curable or cured.

42. A polymer composition having enhanced resistance to water treeing and electrical treeing consisting essentially of (1) a polymeric component (2) an effective amount, as a water treeing and an electrical treeing inhibitor, of an organic compound having the formula:

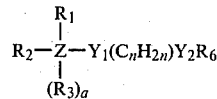

wherein
$R_1$, $R_2$ and $R_3$ are the same or different and are $Y_1(C_nH_{2n})Y_2R_6$, $C_1$ to $C_8$ alkyl, $C_1$ to $C_8$ alkoxy, $C_1$ to $C_8$ acyloxy, $C_6$ to $C_{18}$ aryloxy or substituted aryloxy, $C_5$ to $C_{18}$ aryl or substituted aryl, hydrogen, halogen, an epoxy containing radical, $C_2$ to $C_8$ alkenyl, a nitrogen containing radical, a carboxy containing radical, a mercapto containing radical or an ether containing radical; $R_6$ is $C_1$ to $C_8$ alkyl, $C_1$ to $C_8$ alkoxy, $C_1$ to $C_8$ acyloxy, $C_6$ to $C_{18}$ aryloxy or substituted aryloxy, $C_6$ to $C_{18}$ aryl or substituted aryl, hydrogen, halogen, an epoxy containing radical, $C_2$ to $C_8$ alkenyl, a nitrogen containing radical, a carboxy containing radical, a mercapto containing radical or an ether containing radical;

$Y_1$ and $Y_2$ are the same or different and are O, S or NH;

Z is Si, Sn, Ti, P or B;

a is 0 or 1; and n is 1 to 8, with the proviso that when Z is P, a is O, $Y_1$ and $Y_2$ are each O and $R_1$ and $R_2$ are the same and are $Y_1(C_nH_{2n})Y_2R_6$, (3) 0 to less than 10% filler, and (4) effective amounts of cross-linking agent, antioxidant, plasticizer, dye, pigment, heat stabilizer, light stabilizer or antistatic agent.

* * * * *